US010724826B1

(12) United States Patent
Phillips et al.

(10) Patent No.: US 10,724,826 B1
(45) Date of Patent: Jul. 28, 2020

(54) BALLISTIC CHAIN CUTTING DEVICE

(71) Applicant: Breaching Technologies, Inc., San Antonio, TX (US)

(72) Inventors: Darron Phillips, San Antonio, TX (US); Mark Ferris, San Antonio, TX (US)

(73) Assignee: Breaching Technologies, Inc., San Antonio, TX (US)

( * ) Notice: Subject to any disclaimer, the term of this patent is extended or adjusted under 35 U.S.C. 154(b) by 0 days.

(21) Appl. No.: 16/218,213

(22) Filed: Dec. 12, 2018

(51) Int. Cl.

| | |
|---|---|
| ***F41C 27/20*** | (2006.01) |
| ***B23D 29/00*** | (2006.01) |
| *F41A 21/32* | (2006.01) |
| *B25D 9/11* | (2006.01) |

(52) U.S. Cl.
CPC ................ *F41C 27/20* (2013.01); *B25D 9/11* (2013.01); *F41A 21/32* (2013.01)

(58) Field of Classification Search
CPC ........ F41A 21/32; F41A 21/325; F41C 27/20; F41C 27/00; F41C 27/16
USPC .......................................................... 89/1.14
See application file for complete search history.

(56) References Cited

U.S. PATENT DOCUMENTS 655,577 A * 8/1900 Pell ........................ F41C 27/18 42/90
1,181,223 A 5/1916 Holm
1,211,779 A * 1/1917 Steinmetz .............. F41C 27/20 42/90
2,140,214 A * 12/1938 Temple, Jr. ............ H02G 1/005 83/452
2,145,714 A * 1/1939 Davis ....................... D07B 7/16 72/430
2,411,909 A * 12/1946 Temple ................... F41C 27/20 42/39.5
2,446,994 A 8/1948 Barker
2,454,528 A * 11/1948 Temple .................... B63G 7/04 30/228
3,003,235 A * 10/1961 Temple .................... B63G 7/04 30/180
3,196,746 A * 7/1965 Dahl ....................... F42B 3/006 89/1.14
3,411,401 A * 11/1968 Harris ..................... F41C 27/20 89/1.14

(Continued)

OTHER PUBLICATIONS

Silvertip_3. ".308 vs 7.62 Nato—ar15.com." .308 vs 7.62 Nato—ar15.com. Mar. 9, 2012. Accessed Jun. 18, 2018. https://www.ar15.com/forums/ar-15/_308_vs_7_62_nato/121-566526/.

(Continued)

*Primary Examiner* — Derrick R Morgan
(74) *Attorney, Agent, or Firm* — Edward B. Marvin; Gunn, Lee & Cave, P.C.

(57) ABSTRACT

The present disclosure relates to an Improved Ballistic Chain Cutting Device. In general, the device positions a target link from a multi-link chain in the proper placement for a single shot from a firearm to cut or sever the target link. Embodiments of the improved device include a specially designed slot with stepped sidewalls creating a varying width to tightly receive the target link, a curved adjacent link engagement region to better accommodate the semicircular end of a link adjacent the target link, and a curved target link engagement region to better secure the target link within the device.

23 Claims, 10 Drawing Sheets

(56) References Cited

U.S. PATENT DOCUMENTS

| | | | | |
|---|---|---|---|---|
| 3,643,329 | A * | 2/1972 | Lieberman | B23D 15/145 30/180 |
| 3,780,689 | A * | 12/1973 | Giebel | H02G 1/005 114/221 A |
| 3,879,878 | A | 4/1975 | Musgrave | |
| 3,886,842 | A * | 6/1975 | Giebel | B23D 15/145 89/1.14 |
| 3,950,877 | A | 4/1976 | Musgrave | |
| 3,950,878 | A | 4/1976 | Musgrave | |
| 4,115,944 | A | 9/1978 | Musgrave | |
| 4,120,246 | A * | 10/1978 | Sabranski | B63G 7/04 102/307 |
| 4,805,547 | A * | 2/1989 | Matsuzaki | B63C 11/50 114/221 A |
| 4,826,103 | A * | 5/1989 | McKown | B64C 27/006 114/221 A |
| 5,883,328 | A | 3/1999 | A'Costa | |
| 6,318,228 | B1 | 11/2001 | Thompson | |
| 6,349,474 | B1 * | 2/2002 | Jordan | B23D 15/145 30/228 |
| 6,719,497 | B1 * | 4/2004 | Pollack | B63B 21/00 405/224 |
| 7,328,751 | B2 * | 2/2008 | Peterson | B25B 27/0085 173/1 |
| 7,854,085 | B1 | 12/2010 | Hodgkins et al. | |
| 8,418,592 | B1 | 4/2013 | Gonstad et al. | |
| D682,972 | S | 5/2013 | KasanJian-King | |
| 8,490,534 | B1 | 7/2013 | Moore | |
| 8,893,421 | B2 | 11/2014 | Degidio | |
| 8,893,802 | B2 * | 11/2014 | Luppi | B63B 21/507 166/345 |
| 9,372,048 | B1 * | 6/2016 | Phillips | B25D 9/11 |
| 2014/0305291 | A1 * | 10/2014 | Huse | B63B 21/60 89/1.14 |

OTHER PUBLICATIONS

Maieante. "The Definitive Answer to Can I Shoot .223 in My 5.56?—ar15.com." The Definitive Answer to Can I Shoot .223 in My 5.56 ?—ar15.com. Apr. 13, 2012. Accessed Jun. 18, 2018. https://www.ar15.com/forums/ar-15/The_definitive_answer_to_can_I_shoot_223_in_my_5_56_/118-570475/.

* cited by examiner

BALLISTIC CHAIN CUTTING DEVICE

CROSS REFERENCES TO RELATED APPLICATIONS

Not applicable.

FEDERALLY SPONSORED RESEARCH

Not applicable.

BACKGROUND OF THE INVENTION

1. Field of the Invention

This invention relates generally to devices for gaining forcible entry into locked premises and structures. More specifically, the invention is an improved ballistic chain cutting device that mounts on the barrel of a firearm and holds a target link from multi-link chain in the proper position for a projectile fired from the firearm to cut an opening in the target link.

2. Description of the Related Art

Military personnel and law enforcement officers often encounter situations where they need to gain access into premises or structures locked with a chain comprising multiple interconnected metal links ("multi-link chain"). In many of these situations, criminals, enemy combatants, or other wrongdoers are within the chain-locked premises or structures, and time is of the essence to rapidly gain access. Any time lost through cumbersome forcible entry methods allows additional time for those inside to prepare and defend against such entry, and can literally be the difference between life and death.

There are a variety of ways by which the military personnel and law enforcement personnel can gain access when presented with a chain-locked premise or structure. Ballistic opening of the multi-link chain is one way to rapidly gain access, but requires precision shot placement to properly open the target link. More specifically, the firearm must be aimed at the target link with enough accuracy to ensure the projectile creates an opening in the target link large enough for a link adjacent to the target link ("adjacent link") to pass through the opening. If the first shot does not open the target link enough, multiple shots may be required. However, the first shot alerts those inside that forcible entry is being attempted and multiple shots gives them additional time to prepare and defend against the entry. Thus, reducing the number of shots required to open the target link is an important objective.

Additionally, the shot to open the target link is usually in close quarters with the multi-link chain and the person firing the shot is presented with increased danger from the potential ricochet of the projectile. The risk of ricochet-induced injury increases as more shots are fired. Thus, ensuring the projectile is accurately placed on the target link with the first shot helps reduce this risk.

U.S. Pat. No. 9,372,048 ("Prior Patent"), which Applicant developed and owns, discloses a Ballistic System and Method for Cutting a Multi-Link Metal Chain. The Prior Patent is the subject of currently pending Reissue Patent application Ser. No. 16/013,458 ("Reissue Application"). Both U.S. Pat. No. 9,372,048 and Reissue Patent application Ser. No. 16/013,458 are incorporated herein by reference in their entirety.

Applicant's Prior Patent and the Reissue Application disclose a system and method to properly position the target link of a multi-link chain for ballistic opening or "cutting" of the target link with a single projectile (i.e., with a single "shot"). The present application is directed to improvements of the system and apparatus disclosed in the Prior Patent and the Reissue Application.

BRIEF SUMMARY

The present invention is an Improved Ballistic Chain Cutting Device. It contains improvements over the Prior Patent and the Reissue Application to better secure the target link and the adjacent link within the device. The improvements help ensure the projectile is properly placed on the target link and that the target link opens with the first shot. The improvements generally comprise an embodiment with a stepped slot between a first target link pin and a second target link pin to better accommodate differing chain sizes, an embodiment with the slot extending below a planar surface on a base member of the device, an embodiment with curved adjacent link engagement regions to better accommodate differing chain sizes, an embodiment with a curved target link engagement surface, and variations or combinations of the aforementioned embodiments. Additionally, further improvements will become apparent in the detailed description of certain embodiments infra.

DETAILED DESCRIPTION OF CERTAIN EMBODIMENTS

Figure 1:
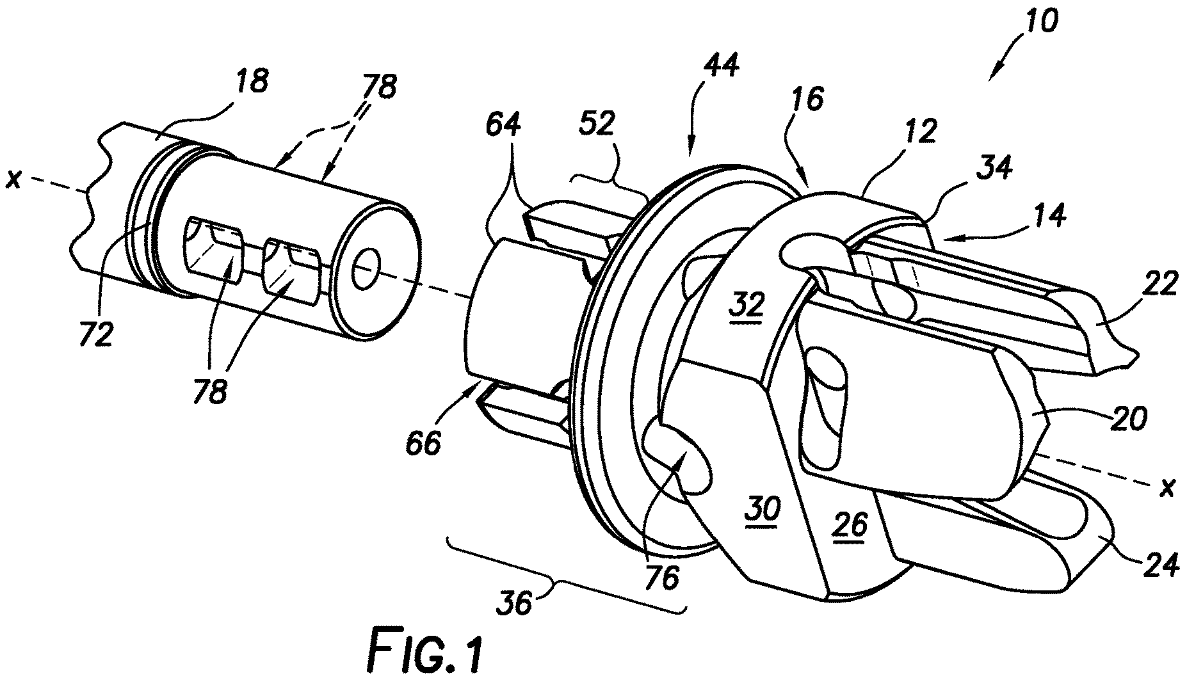
FIG. 1 is a perspective view showing an embodiment of the present invention and a firearm barrel, from a distal end of the embodiment.

FIG. 1 shows an embodiment 10 that includes a base member 12 having a distal end 14 and a proximal end 16. In operation, the proximal end 16 of the base member 12 faces toward a firearm barrel 18 and the distal end 14 faces away from the firearm barrel 18.

A first target link pin 20, a second target link pin 22, and an adjacent link pin 24 extend from the distal end 14 of the base member 12. Preferably, the distal end 14 has a planar surface 26 from which the first target link pin 20, the second target link pin 22, and the adjacent link pin 24 extend. Additionally, the base member 12 has exterior side surfaces intersecting the planar surface 26, which may alternate between planar and curved. For example, FIG. 1 shows a planar side surface 30 along the front of the embodiment 10 and a curved side surface 32 along the top of the embodiment 10. Additionally, a beveled edge 34 may be placed at the intersection between the planar surface 26 and one or more of the side surfaces.

Figure 2:
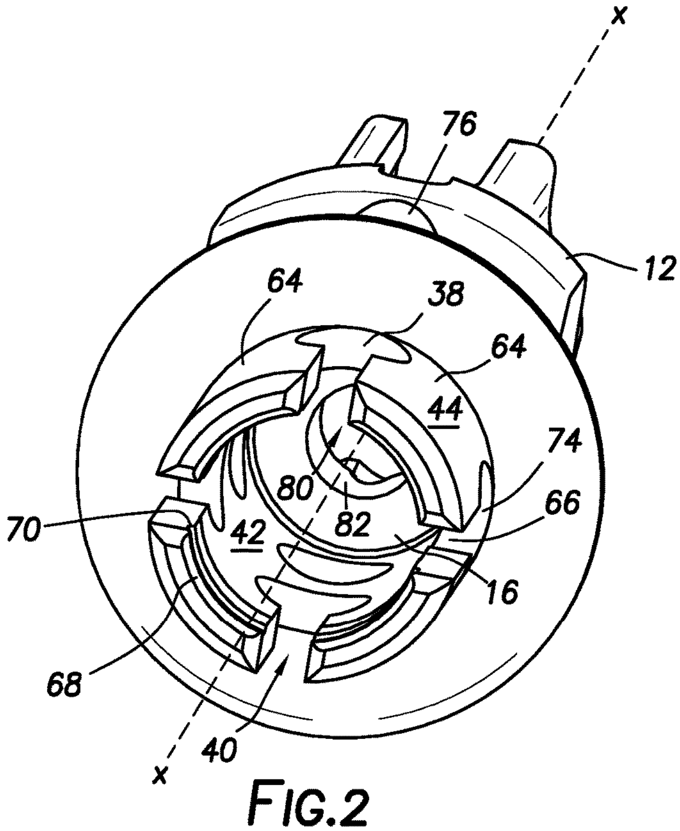
FIG. 2 is a perspective view of the embodiment shown in FIG. 1, from a proximal end of the embodiment.
Figure 3:
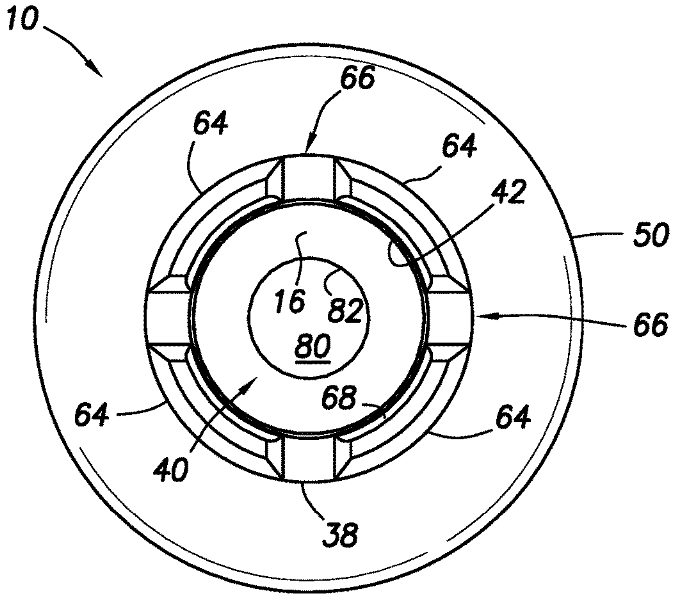
FIG. 3 is a plan view of the proximal end of the embodiment shown in FIG. 1.

Referring to FIGS. 1, 2, & 3, a barrel-receiving portion 36 extends from the proximal end 16 of the base member 12. The barrel-receiving portion 36 generally comprises at least one wall with an interior surface defining a substantially cylindrical volume. The barrel-receiving portion 36 can take many forms, depending on the embodiment. For example, the barrel-receiving portion 36 in the embodiment 10 comprises a wall 38 with a generally uniform interior surface 42 that forms a substantially cylindrical volume 40 and a non-uniform exterior surface 44. Concerning the latter, the exterior surface 44 has a generally cylindrical profile, but the circumference around the cylindrical profile varies greatly due to features on the exterior.

Figure 4:
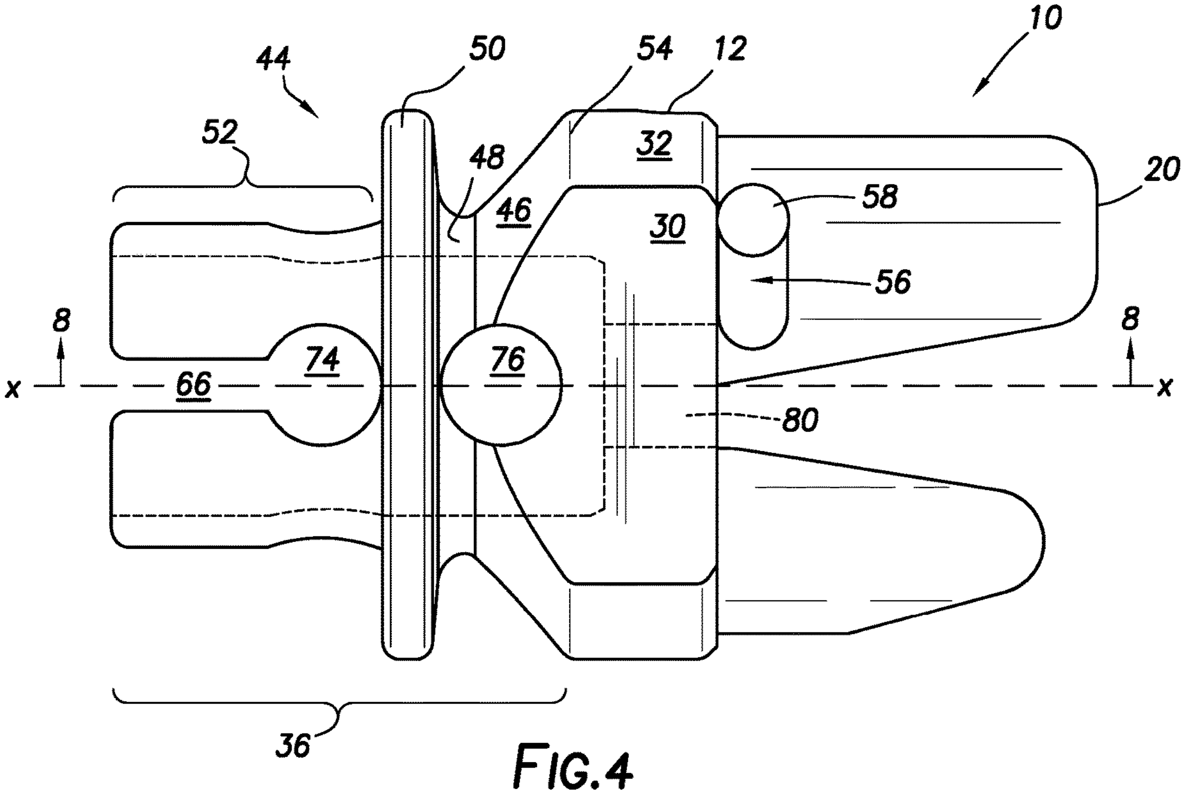
FIG. 4 is a side view of the embodiment shown in FIG. 1.

As best shown in FIG. 4, the features on the exterior surface 44 includes a tapered surface 46 where the circumference of the generally cylindrical profile decreases from the base member 12, a transition surface 48, a flange 50, and a barrel entry 52. Additionally, the planar side surface 30 of the base member 12 continues into the barrel-receiving portion 36 so as to be adjacent the tapered surface 46, while a beveled edge 54 is positioned between the curved side surface 32 of the base member 12 and the tapered surface 46.

FIG. 4 also shows an obround cutout 56 that includes a breakaway aperture 58 on the first target link pin 20 adjacent the base member 12. Although not shown, the embodiment 10 is symmetric and has a similarly shaped and positioned cutout and breakaway aperture on the second target link pin 22. The cutout 56 is an area where material has been removed from a target link pin. When present, the cutout 56 and the breakaway aperture 58 encourage the first target link pin 20 and the second target link pin 22 to break apart from the base member 12 when the embodiment 10 is used and a shot is fired, thereby making the embodiment 10 a single-use device.

Referring to FIGS. 1-4, the barrel entry portion 52 comprises a plurality of fingers 64 separated by expansion gaps 66. Each of the fingers 64 has a beveled edge 68 leading into an interior groove 70 that accepts a flange 72 on the exterior of the firearm barrel 18 and the expansion gaps 66 allow the fingers 64 to flex radially outward when the embodiment 10 is inserted onto the firearm barrel 18 over the flange 18. Each of the expansion gaps 66 extends into a vent aperture 74 that extends between the interior surface 42 and the exterior surface 44 of the barrel-receiving portion 36 at the barrel entry 52. Additional vent apertures 76 extending between the interior surface 42 and the exterior surface 44 are also present in the embodiment 10. These additional vent apertures 76 exit the exterior surface 44 at the intersection of the tapered surface 46 and transition surface 48.

The exact configuration of the barrel entry 52 and the shape of the substantially cylindrical volume 40 depend on the design of the firearm barrel 18 used with the device. In practice, the interior surface 42 preferably contains one or more features that allow the device to be fixed on the firearm barrel 18 so the device does not fall off the barrel 18 due to gravity when the barrel 18 is pointed or aimed in a downward direction. For example, the illustrated embodiment 10 is designed to fit onto a Surefire® flash suppressor Model Number SFMB-556-1/2-28 and the interior groove 70 on the interior surface 42 of each of the fingers 64 accepts the flange 72, as discussed above. However, alternative embodiments contain different features which allow the device to be fixed onto other types of firearm barrels or other components (e.g., compensators, flash suppressors, silencers, etc.) attached to the muzzle end of a firearm barrel.

Additionally, the wall 38 may have other features designed to correlate with the type of firearm barrel 18 on which the device is mounted. For example, the vent apertures 74, 76 are alignable with vents 78 on the firearm barrel 18 so that the vents 78 can properly expel gas when the projectile is fired. More specifically, the embodiment 10 contains a total of four vent apertures 74 and four additional vent apertures 76 at ninety degree intervals around the substantially cylindrical volume 40, making a total of eight vent apertures 74, 76. The embodiment 10 can be rotated on the firearm barrel 18 about a center axis x to align some of the vent apertures 74, 76 with the vents 78 on the barrel 18. While the illustrated firearm barrel 18 only requires a total of four vent apertures to align with its vents 78, the extra vent apertures on the embodiment 10 reduce the amount of time and rotation required for alignment to be obtained. In particular, the embodiment 10 requires, at most, a ninety degree rotation about the center axis x before four of the vent apertures 74, 76 become properly aligned with the vents 78. However, in alternative embodiments, more or less vent apertures 74, 76 may be present or even no vent apertures 74, 76 at all.

FIGS. 2 & 3 also show a projectile aperture 80 at the proximal end 16 of the base member 12. The projectile aperture 80 is defined by a sidewall 82 extending through the base member 12, between its proximal end 16 and its distal end (not shown). The projectile aperture 80 is centered on the center axis x, with center axis x also being the center of the substantially cylindrical volume 40. Preferably, but not necessarily, the sidewall 82 defines a substantially cylindrical projectile aperture 80.

Figure 5:
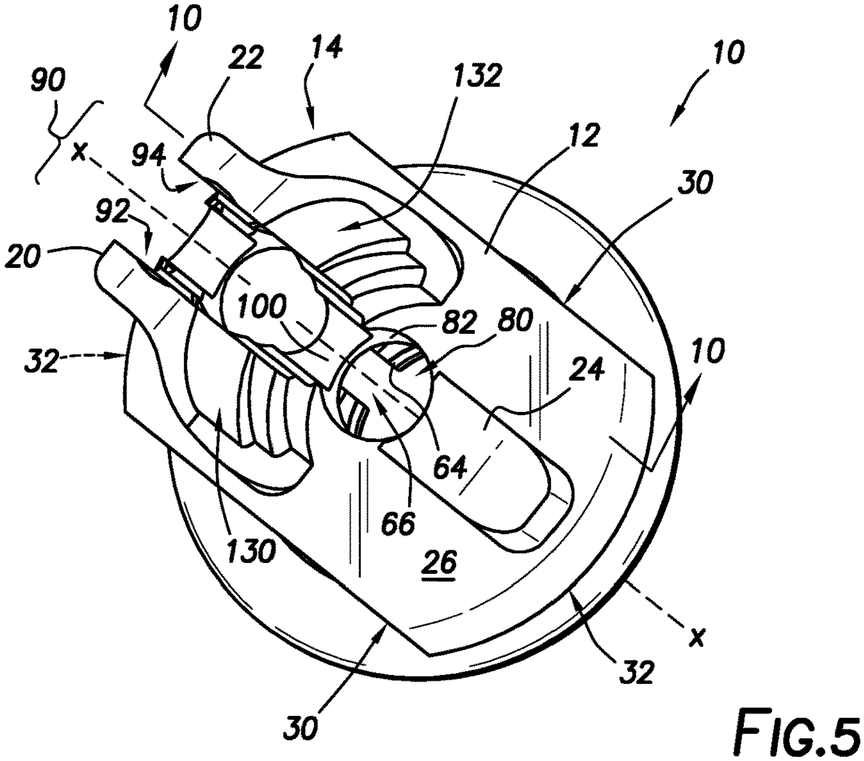
FIG. 5 is a perspective view of the embodiment shown in FIG. 1, from the distal end of the embodiment at an angle different than that shown in FIG. 1.

FIG. 5 shows the projectile aperture 80 and the center axis x at the distal end 14 of the base member 12, with the aperture 80 opening into the planar surface 26 in the center of the embodiment 10. Two of the fingers 64 and one of the expansion gaps 66 can be seen through the projectile aperture 80, and the aperture 80 should be large enough for a projectile (not shown) exiting the firearm barrel 18 to pass through the aperture 80 without contacting the sidewall 82.

FIG. 5 also illustrates the preferred orientation of the first target link pin 20, the second target link pin 22, and the adjacent link pin 24 extending from the distal end 14 of the base member 12. In the embodiment 10, these elements extend from the planar surface 26; however in alternative embodiments the planar surface 26 may not be present such as, for example, if the surface 26 were not planar. Also shown are the alternating planar side surfaces 30 and curved side surfaces 32 on the exterior sides of the base member 12, which may be shaped or configured differently in alternative embodiments.

FIG. 5 also illustrates a slot 90 between a first pin target link alignment region 92 on the first target link pin 20 and a second pin target link alignment region 94 on the second target link pin 22. The first pin target link alignment region 92 and the second pin target link alignment region 94 are the areas of, respectively, the first target link pin 20 and the second target link pin 22 between which a target link of a multi-link chain (not shown) is positioned during use of the device. As such, the slot 90 has a first sidewall 96 at least partially defined by the first pin target link alignment region 92 and a second sidewall 98 at least partially defined the second pin target link alignment region 94, as shown in FIG. 6.

Figure 6:
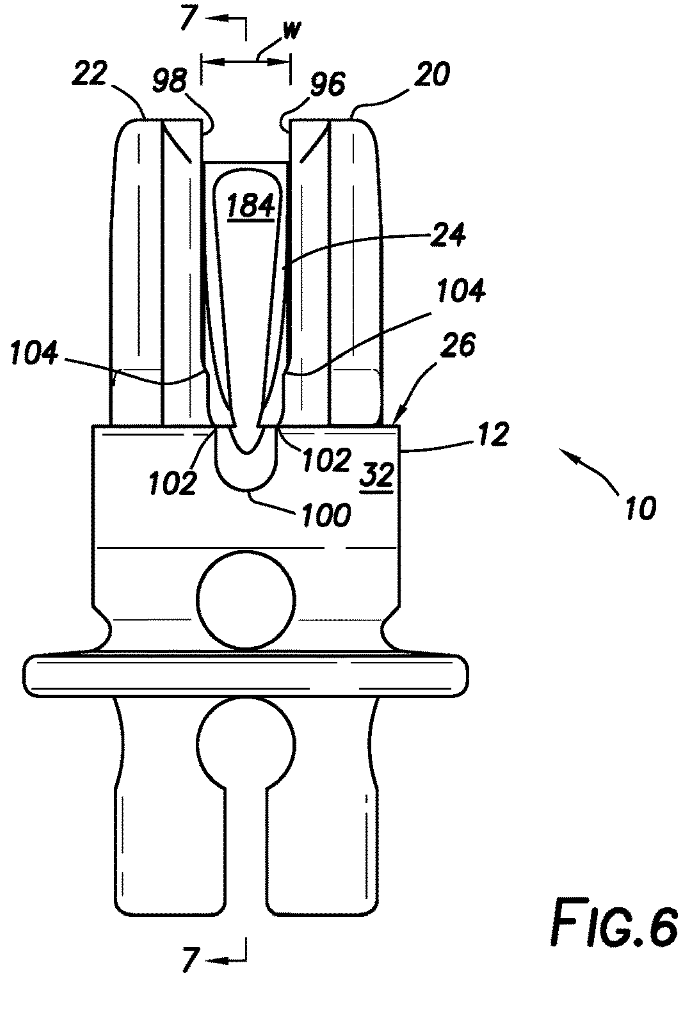
FIG. 6 is a side view of the embodiment shown in FIG. 1.

As shown in FIGS. 5 & 6, the first and second sidewalls 96, 98 preferably extend through the planar surface 26 into the base member 12 and come together to form a bottom 100 of the slot 90. In the embodiment 10, the slot 90 extends into one of the curved side surfaces 32 of the base member 12. The sidewalls 96, 98 define a width w of the slot 90, which varies in the illustrated embodiment 10. For example, the sidewalls 96, 98 in the embodiment 10 have one or more pairs of corresponding steps where the width w increases, as the sidewalls 96, 98 extend further away from the bottom 100. More specifically, the width w increases at a first pair of corresponding steps 102 positioned adjacent the planar surface 26 of the base member 12, followed by a width w increase at a second pair of corresponding steps 104.

Figure 7:
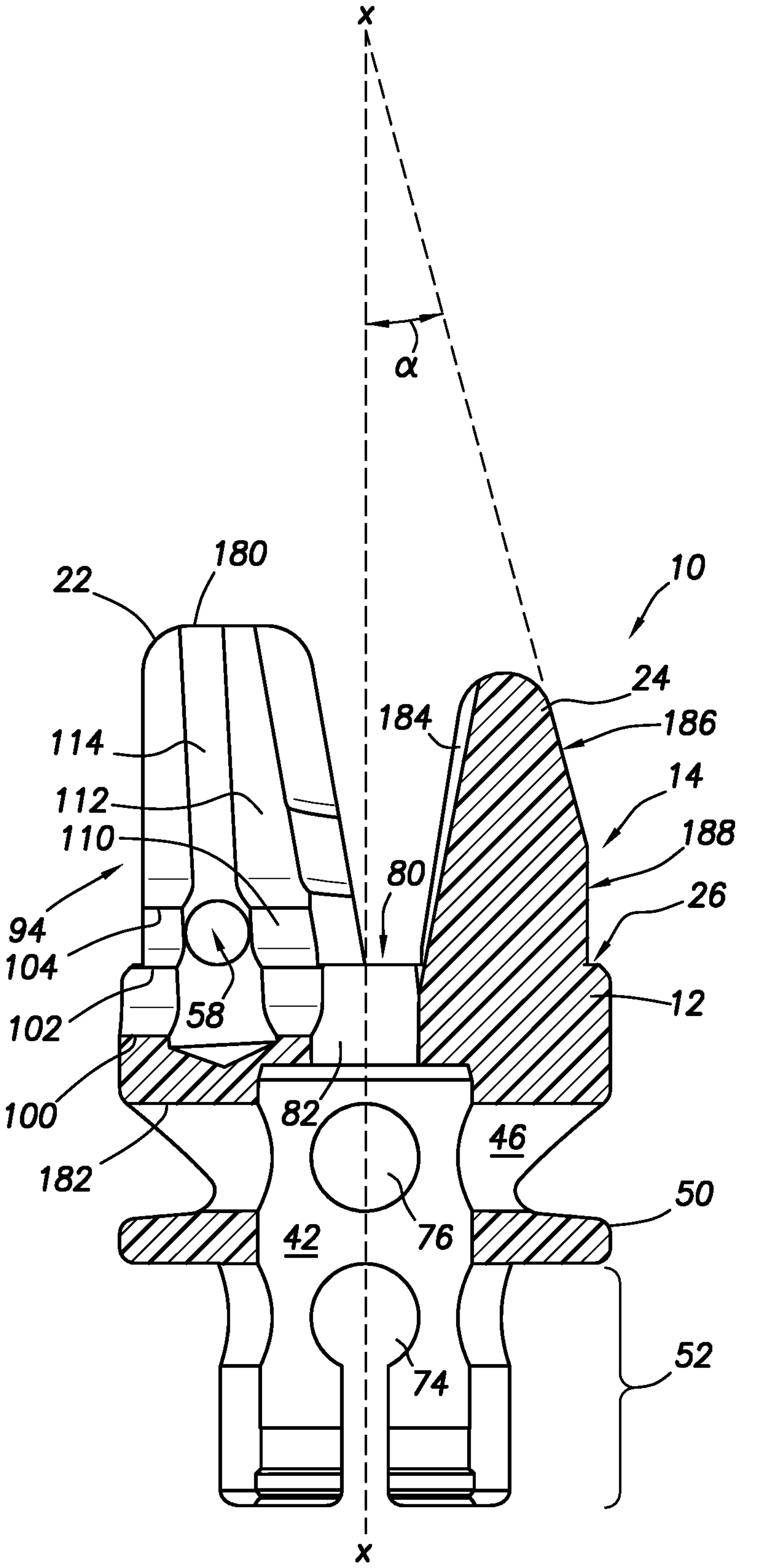
FIG. 7 is a side cross-sectional view of the embodiment shown in FIG. 1, taken along section line 7-7 in FIG. 6.

FIG. 7 shows the second pin target link alignment region 94 of the second pin 22. The second pin target link alignment region 94 is a mirror image of the first pin target link alignment region 92 (not shown) because the embodiment 10 is symmetric about the mid-plane at section line 7-7 in FIG. 6. Thus, if a first plane were extended between each step in the first pair of corresponding steps 102 and a second plane were extended between each step in the second pair of corresponding steps 104, both planes would be parallel to the planar surface 26 at the distal end 14 of the base member 12. In the embodiment 10, the planar surface 26 is orthogonal to the center axis x and, thus, each of the pairs of corresponding steps 102, 104 in the embodiment 10 is oriented substantially orthogonal to the center axis x.

Figure 8:
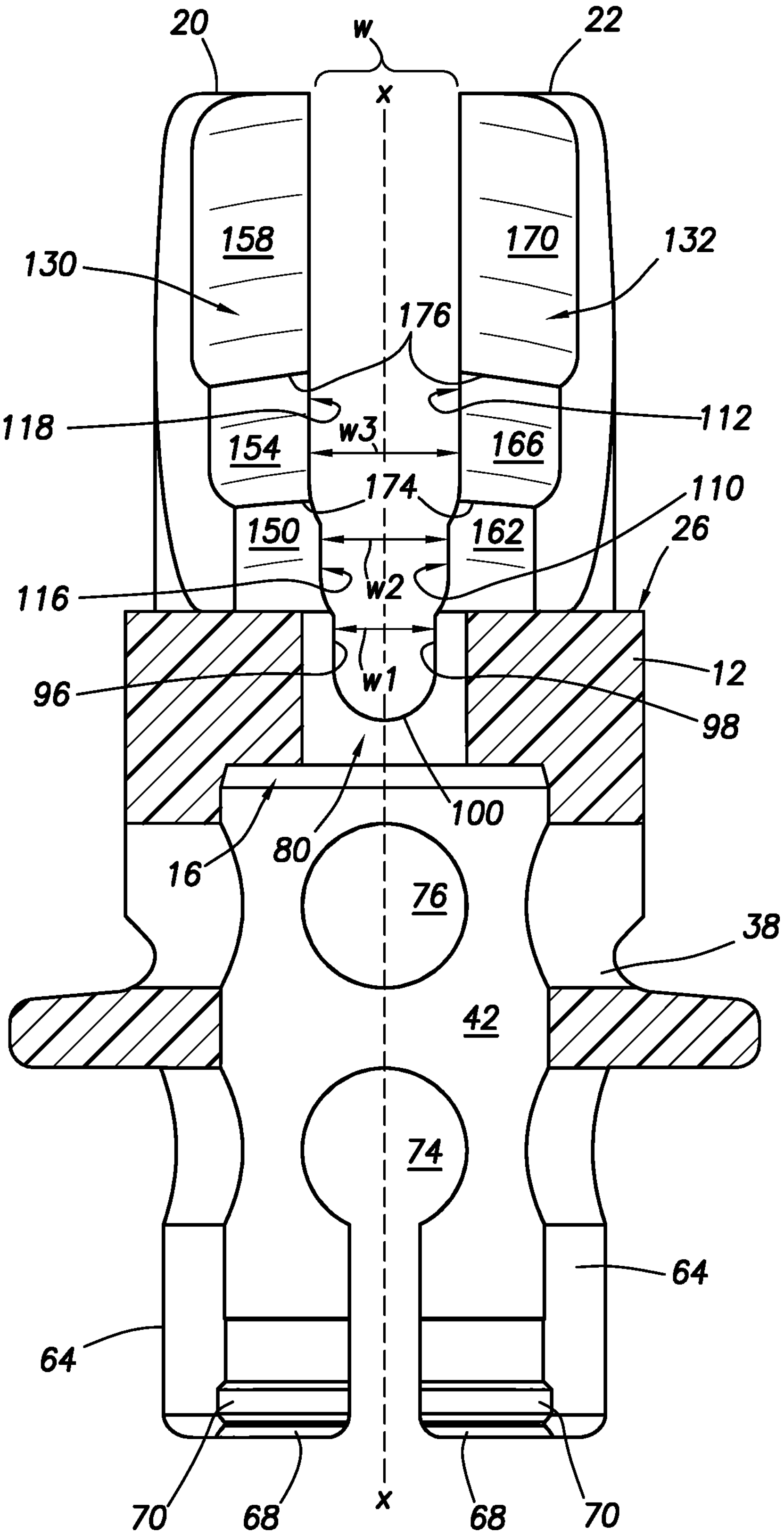
FIG. 8 is a side cross-sectional view of the embodiment shown in FIG. 1, taken along section line 8-8 in FIG. 4.

Preferably, the first pin and second pin target link alignment regions 92, 94 each have at least one planar surface substantially parallel to each other. For example, FIG. 7 shows the embodiment 10 has a first planar surface 110 and a second planar surface 112 on the second pin target link alignment region 94, with each planar surface 110, 112 separated by a bore wall 114 that contains the breakaway aperture 58. Referring to FIG. 8, the first planar surface 110 is substantially parallel to a first planar surface 116 on the first pin target link alignment region 92 and forms a width w1, while the second planar surface 112 is substantially parallel to a second planar surface 118 on the first pin target link alignment region 92 and forms a width w2. Additionally, each of the planar surfaces 110, 112, 116, 118 in the embodiment 10 is oriented substantially orthogonal to the planar surface 26 of the distal end 14 because they would form a ninety-degree angle with the planar surface 26 if they intersected it.

Referring back to FIG. 5, the first target link pin 20 has a first pin adjacent link engagement region 130 and the second target link pin 22 has a second pin adjacent link engagement region 132. As will be seen, the first pin and second pin adjacent link engagement regions 130, 132 are areas where a link adjacent to the target link (the "adjacent link") rests against, or engages, when the target link is placed in the slot 90 for operation of the device. In the embodiment 10, the first pin and second pin adjacent link engagement regions 130, 132 each contain at least one curved surface for a semicircular end of the adjacent link to nest within. More specifically, the curved surface on the first pin adjacent link engagement region 130 and the curved surface on second pin adjacent link engagement region 132 are aligned to define part of a circumference of a circle having a radius equal to the radius of the outer circumference of the semicircular end of the adjacent link.

In the illustrated embodiment 10, three distinct curved surfaces on the first pin adjacent link engagement region 130 align with three distinct curved surfaces on the second pin adjacent link engagement region 132. Referring to FIG. 8, the first pin adjacent link engagement region 130 has a primary curved surface 150, a secondary curved surface 154, and tertiary curved surface 158 that each align with, respectively, a primary curved surface 162, a secondary curved surface 166, and tertiary curved surface 170 of the second pin adjacent link engagement region 132. Preferably, but not necessarily, the primary curved surfaces 150, 162 intersect with the planar surface 26.

Figure 10:
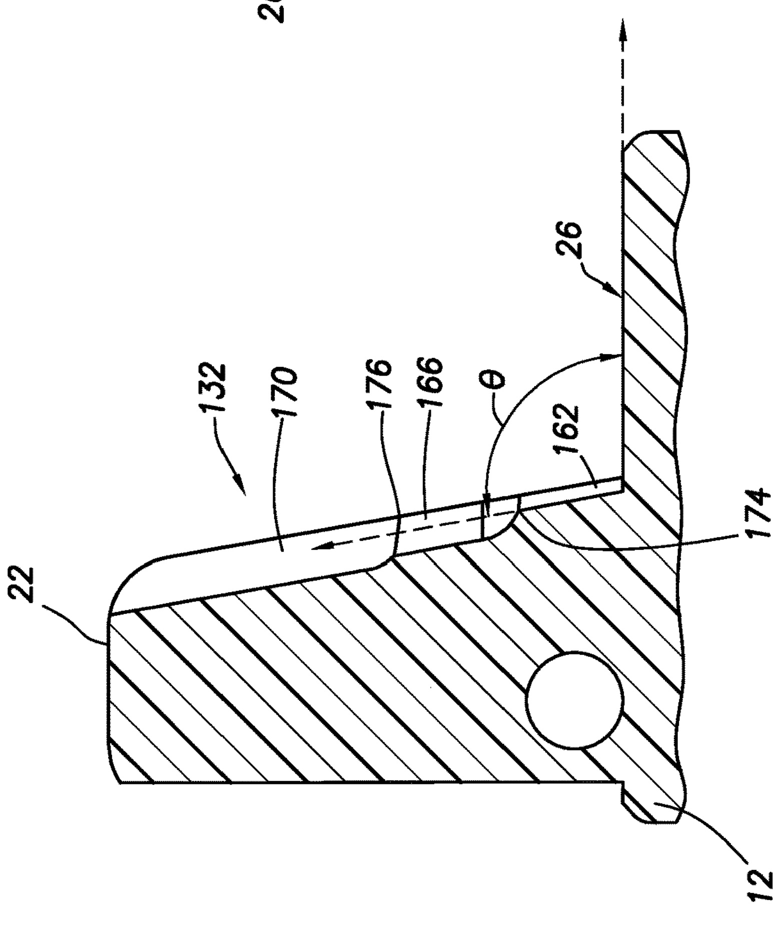
FIG. 10 is blown-up cross sectional view of embodiment shown in FIG. 1, taken along section line 5-5 in FIG. 5.

As shown in FIG. 10, the intersection between the primary curved surface 162 of the second pin adjacent link engagement region 132 forms an angle θ between the primary curved surface 162 and the planar surface 26, with angle θ being greater than ninety degrees. Although not shown in FIG. 10, an angle equal to angle θ is also formed at the intersection of the primary curved surface 150 of the first pin adjacent link engagement region 130 due to the symmetry of the embodiment 10

Referring back to FIG. 8, the illustrated embodiment 10 has steps separating the various curved surfaces, thereby creating pairs of corresponding steps between the first pin adjacent link engagement region 130 and the second pin adjacent link engagement region 132. In particular, there is a first pair of corresponding steps 174 separating the primary curved surfaces 150, 162 and the secondary curved surfaces 154, 166, as well as a second pair of corresponding steps 176 separating the secondary curved surfaces 154, 166 and the tertiary curved surfaces 158, 170. At each of the pairs of corresponding steps 174, 176 the partial circumference defined by the curved surfaces expands.

Figure 9:
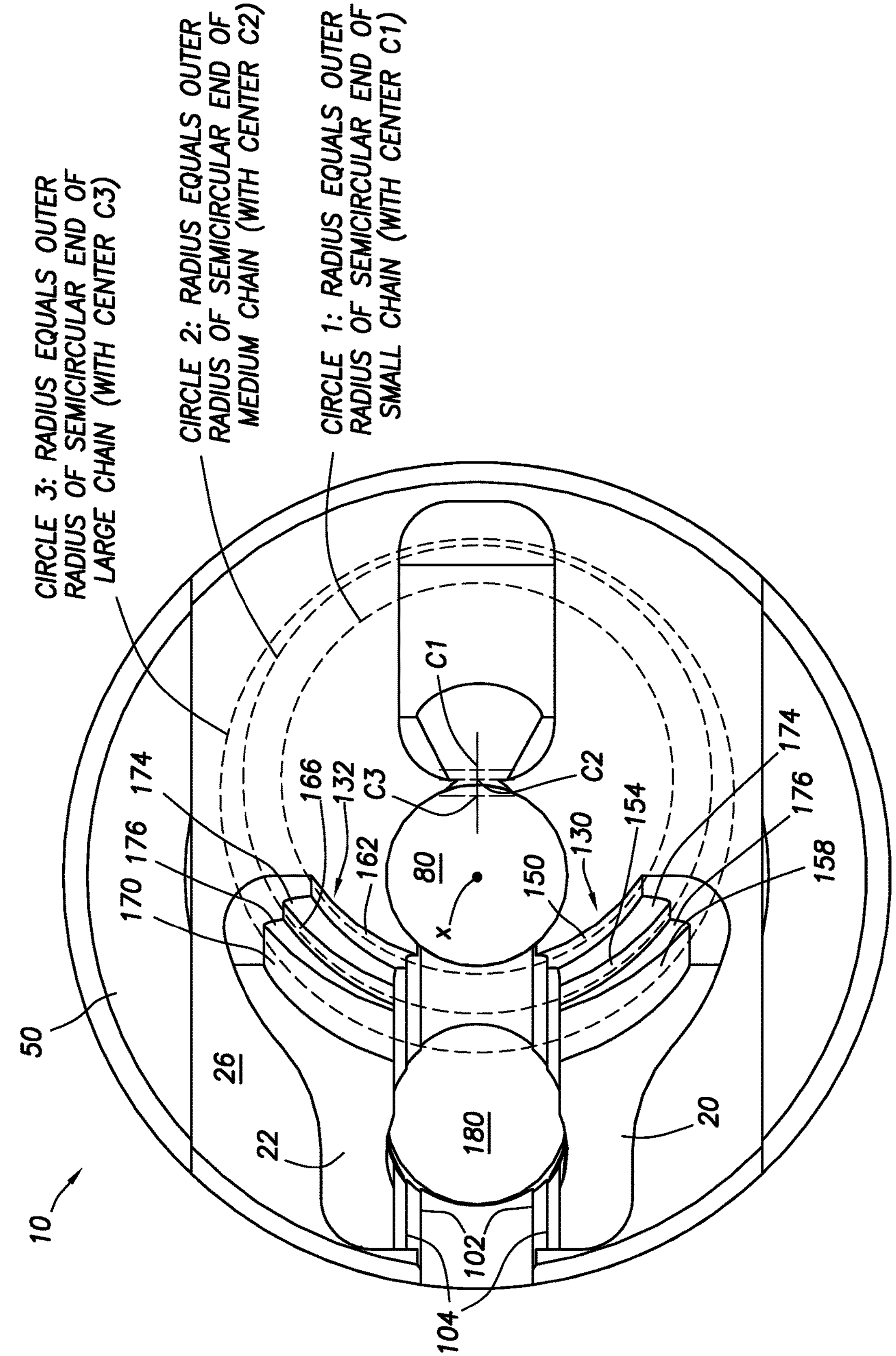
FIG. 9 is a plan view of the distal end of the embodiment shown in FIG. 1.

As shown in FIG. 9, the three distinct curved surfaces on the first and second pin adjacent link engagement regions 130, 132 are aligned to form the partial circumference of three distinct circles having three distinct centers. In particular, the primary curved surfaces 150, 162 are aligned to form a partial circumference of Circle 1 having center C1, the secondary curved surfaces 154, 166 are aligned to form a partial circumference of Circle 2 having center C2, and the tertiary curved surfaces 158, 170 are aligned to form a partial circumference of Circle 3 having center C3, and none of the circle centers C1, C2, or C3 is coaxial with the center axis x of the projectile aperture 80. As shown, Circle 1 is smaller than Circle 2 and Circle 2 is smaller than Circle 3, and the partial circumference formed by the primary curved surfaces 150, 162 is smaller than the partial circumference formed by the secondary curved surfaces 154, 166, and the partial circumference formed by the secondary curved surfaces 154, 166 is smaller than the partial circumference formed by the tertiary curved surfaces 158, 170.

With three differently sized partial circumferences being formed by the three sets of aligned curved surfaces, three different sizes of multi-link chains are accommodated in the embodiment 10. More specifically, Circle 1 has a radius R1 equal to the radius of the outer circumference of the semi-circular end of a small-sized adjacent link, Circle 2 has a radius R2 equal to the radius of the outer circumference of the semicircular end of a medium-sized adjacent link, and Circle 3 has a radius R3 equal to the radius of the outer circumference of the semicircular end of a large-sized adjacent link. For example, a ¼" chain may nest within the partial circumference defined by the primary curved surfaces 150, 162, a 5⁄16" chain may nest within the partial circumference defined by the secondary curved surfaces 154, 166, and a ⅜" chain may nest within the partial circumference defined by the tertiary curved surfaces 158, 170.

It should be noted, however, that in alternative embodiments the curved surface on the first pin adjacent link engagement region 130 and the curved surface on the second pin adjacent link engagement region 132 may be configured differently or may not be curved. Additionally, there may be more or less pairs of corresponding steps between the first pin adjacent link engagement region 130 and the second pin adjacent link engagement region 132, or no steps at all.

FIG. 9 also shows a bore 180 that is preferably between the first and second target link pins 20, 22. The bore 180 extends through the first and second pairs of corresponding steps 102, 104 on the first pin and second pin target link alignment regions 92, 94. As best shown in FIG. 7, the bore wall 114 extends along the second pin target alignment region 94 with the bore 180 being not quite perpendicular to the planar surface 26. The bore 180 terminates a bottom end 182 further within the base member 12 than the bottom 100 of the slot 90. The bore wall 114 extends along the first pin target link alignment region 92 in a similar manner due to the symmetry of the embodiment 10. When present, the bore 180 provides additional space for a chain weld on the target link to fit within.

Referring back to FIG. 6, the adjacent link pin 24 can be seen though the slot 90. The adjacent link pin 24 preferably has a curved surface 184 that narrows as it approaches the planar surface 26. The curved surface 184 in the embodiment 10 also extends from the adjacent link pin 24 into the base member 12, slightly below the planar surface 26. FIG. 7 shows part of the curved surface 184 on the adjacent link pin 24, as well as an angled back surface 186 opposite the curved surface 184. The angled back surface 186 extends from a generally vertical back surface 188, with the generally vertical back surface 188 intersecting the planar surface 26 of the distal end 14 at a substantially perpendicular angle. Preferably, the angled back surface 186 is oriented at an acute angle with respect to the center axis x. As shown, if the angled back surface 186 was extended, it would intersect the center axis x at an acute angle $\alpha$.

Figure 11A:
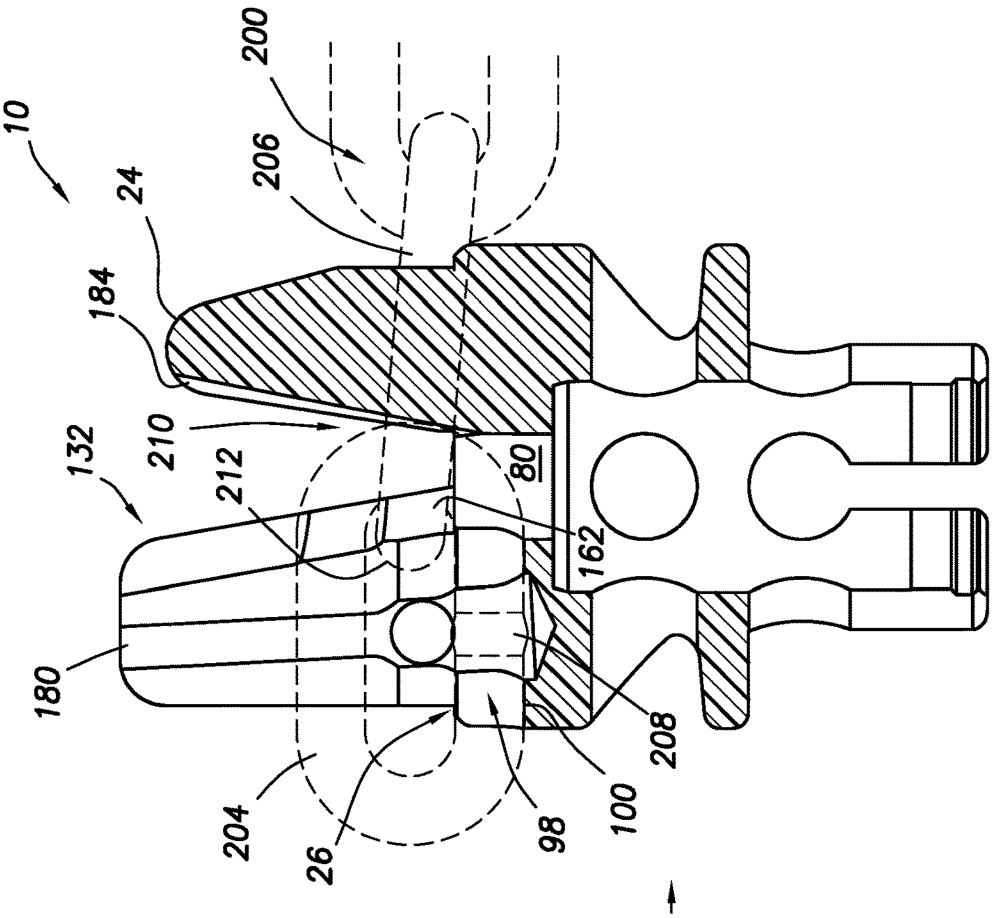
FIG. 11A is a side cross-sectional view of the embodiment shown in FIG. 1, taken along section line 7-7 in FIG. 6, with a large-sized multi-link chain shown in phantom.
Figure 11C:
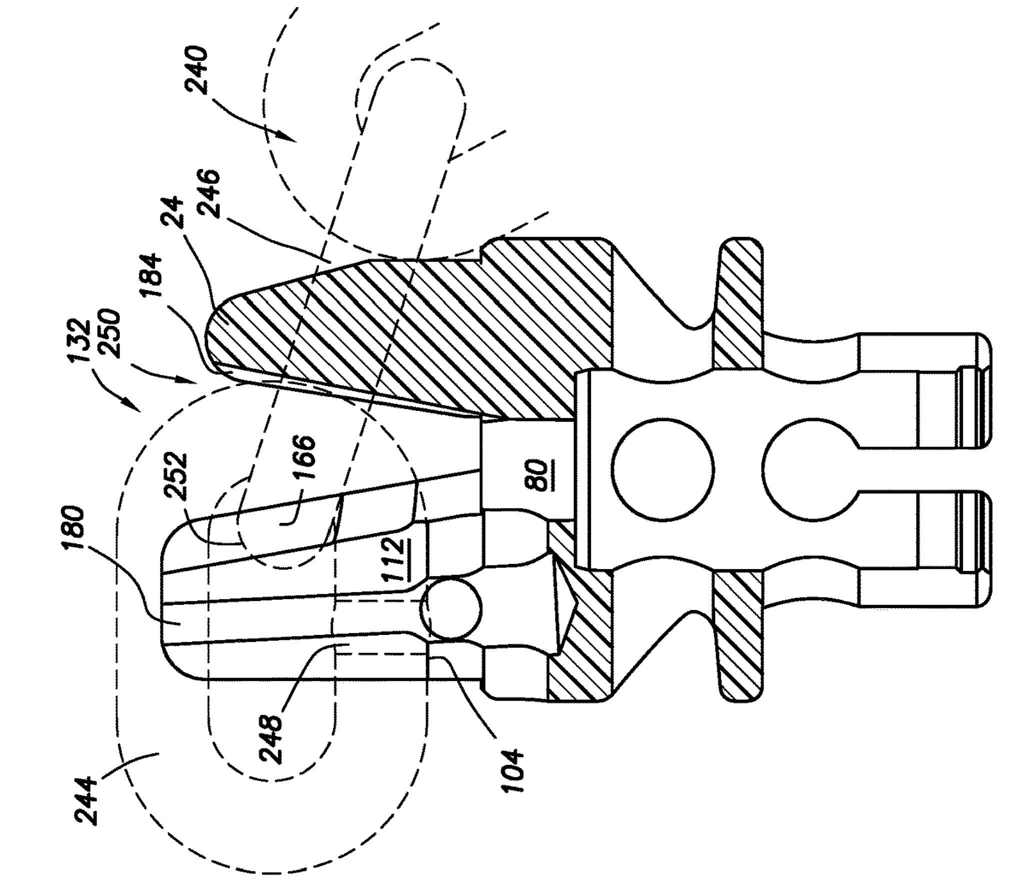
FIG. 11C is a side cross-sectional view of the embodiment shown in FIG. 1, taken along section line 7-7 in FIG. 6, with a small-sized multi-link chain shown in phantom.
Figure 11B:
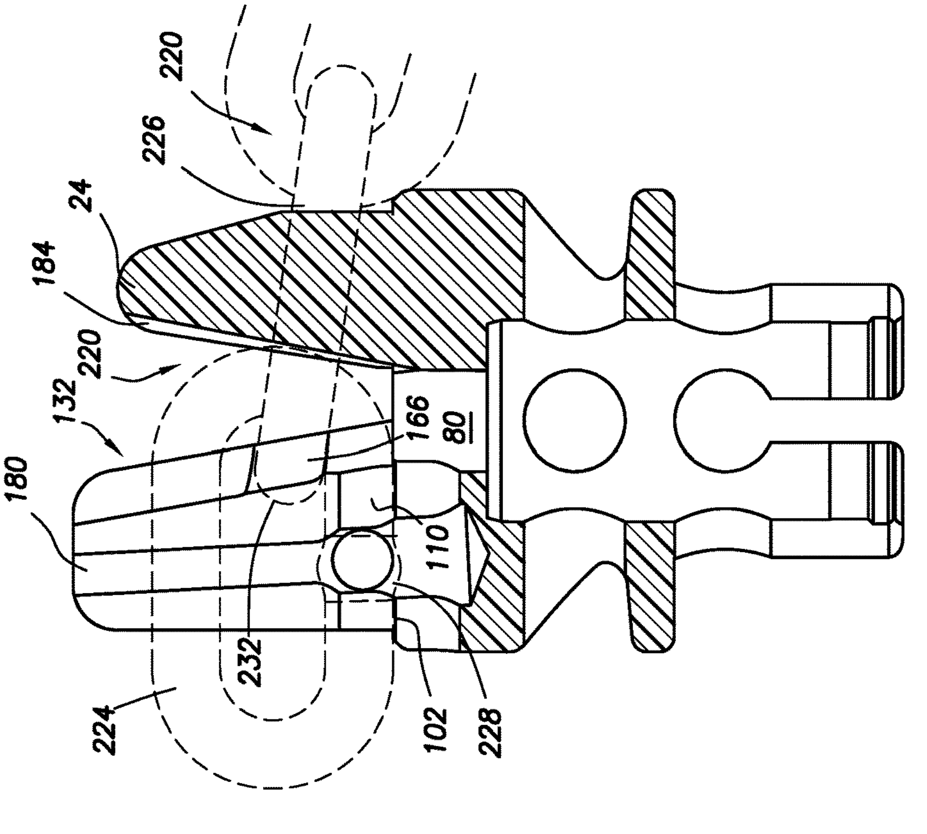
FIG. 11B is a side cross-sectional view of the embodiment shown in FIG. 1, taken along section line 7-7 in FIG. 6, with a medium-sized multi-link chain shown in phantom.

FIGS. 11A-11C illustrate a cross section of the embodiment 10 in use with a multi-link chain of different sizes. In FIG. 11A, a small-sized chain 200 is shown, with a target link 204 and an adjacent link 206. The target link 204 fits within the slot 90 such that a portion of the target link 204 rests against the bottom 100 of the slot 90. The portion that rests against the the bottom 100 of the slot 90 also fits tightly within the portion of the slot sidewall 98 between the bottom 100 and the planar surface 26 and the corresponding portion of the slot sidewall 96 between the bottom 100 and the planar surface 26 (not shown) at width w1 in FIG. 8. A chain weld 208 on the target link 204 is within the bore 180 and a semicircular end 210 of the target link 204 is engaged with the curved surface 184 of the adjacent link pin 24 close to the projectile aperture 80, with a portion of the target link 204 within the aperture 80. The adjacent link pin 24 is inserted through the adjacent link 206 and a semicircular end 212 of the adjacent link 206 is nested within the primary curved surface 162 of second pin adjacent link engagement region 132.

In FIG. 11B, a medium-sized chain 220 is shown, with a target link 224 and an adjacent link 226. The target link 224 fits within the slot 90 such that a portion of the target link 224 rests against the first pair of corresponding steps 102. The portion that rests against the first pair of corresponding steps 102 also fits tightly within the first planar surface 110 of the second pin target link alignment region 94 and the first planar surface 116 of the first pin target link alignment region 92 (not shown) at width w2 in FIG. 8. A chain weld 228 on the target link 224 is within the bore 180 and a semicircular end 220 of the target link 224 is engaged with the curved surface 184 of the adjacent link pin 24 at a location on the curved surface 184 further away from the projectile aperture 80 than the location where the small-sized chain 200 was engaged, and none of the target link 224 is within the aperture 80. The adjacent link pin 24 is inserted through the adjacent link 226 and a semicircular end 232 of the adjacent link 226 is nested within the secondary curved surface 166 of second pin adjacent link engagement region 132.

In FIG. 11C, a large-sized chain 240 is shown, with a target link 244 and an adjacent link 246. The target link 244 fits within the slot 90 such that a portion of the target link 244 rests against the second pair of corresponding steps 104. The portion that rests against the second pair of corresponding steps 104 also fits tightly within the second planar surface 112 of the second pin target link alignment region 94 and the second planar surface 118 of the first pin target link alignment region 92 (not shown) at width w3 in FIG. 8. A chain weld 248 on the target link 244 is within the bore 180 and a semicircular end 250 of the target link 244 is engaged with the curved surface 184 of the adjacent link pin 24 at a location on the curved surface 184 further away from the projectile aperture 80 than the location where the medium-sized chain 220 was engaged, and none of the target link 244 is within the aperture 80. The adjacent link pin 24 is inserted through the adjacent link 246 and a semicircular end 252 of the adjacent link 246 is nested within the tertiary curved surface 166 of second pin adjacent link engagement region 132.

Figure 12:
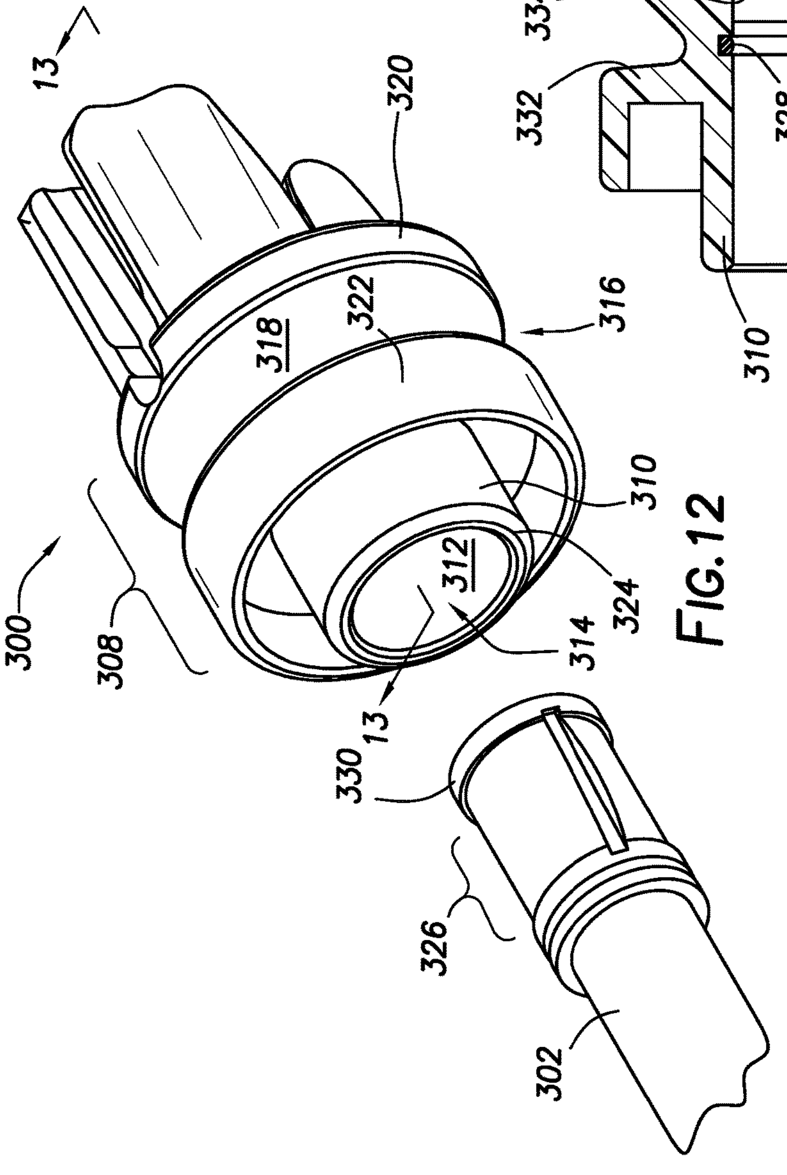
FIG. 12 is a perspective view showing a second embodiment of the present invention and a firearm barrel, from a proximal end of the embodiment.

FIG. 12 shows a second embodiment 300 of the device for use with a standard, military specified A2 Birdcage firearm barrel 302. The embodiment 300 has a barrel-receiving portion 308 with a wall 310 having a generally uniform interior surface 312 that forms a substantially cylindrical volume 314 and a non-uniform exterior surface 316. Concerning the latter, the exterior surface 316 has a generally cylindrical profile, but the circumference around the cylindrical profile varies greatly due to features on the exterior. The features on the exterior surface 316 include a tapered surface 318—where the circumference of the generally cylindrical profile decreases from a cylindrical base member 320—and a skirted flange 322, with the skirted flange 322 at least partially surrounding a continuous barrel entry 324 that does not have expansion gaps.

Figure 13:
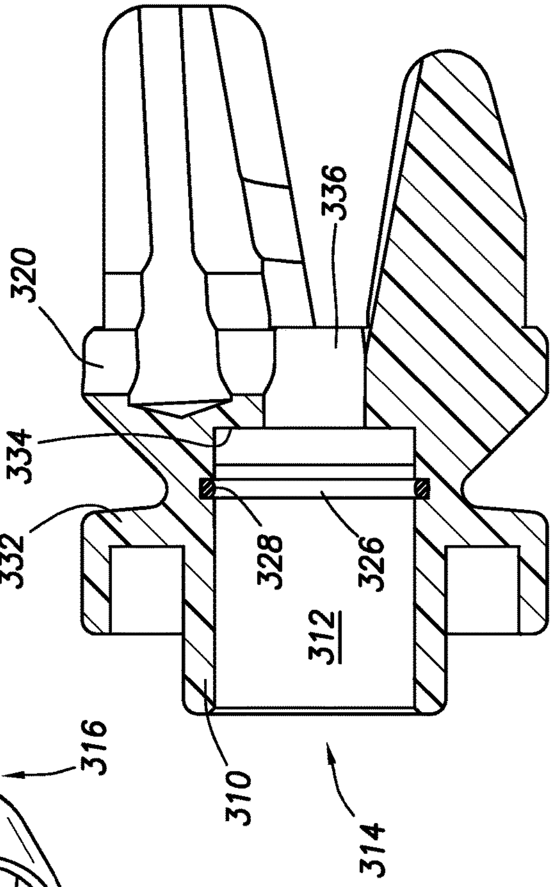
FIG. 13 is a side cross-sectional view of the embodiment shown in FIG. 12, taken along section line 13-13 in FIG. 12.

FIG. 13 illustrates the substantially cylindrical volume 314 formed by the interior surface 312 of the wall 310. The interior surface 312 has a groove 326 disposed therein that accepts an O-ring 328. The firearm barrel 302 has a flange 330 and a groove 332 disposed around its circumference and, during insertion, the O-ring 328 flexes radially outward until the flange 330 is between the groove 326 and a proximal end 334 of the base member 320 with a projectile aperture 336. Then, once the flange 330 is positioned between the groove 326 and the proximal end 334, the O-ring 328 rests within the groove 326 on the interior surface 312 and the groove 332 on the firearm barrel 302, thereby helping to hold the embodiment 300 in place on the firearm barrel 302.

Figure 14:
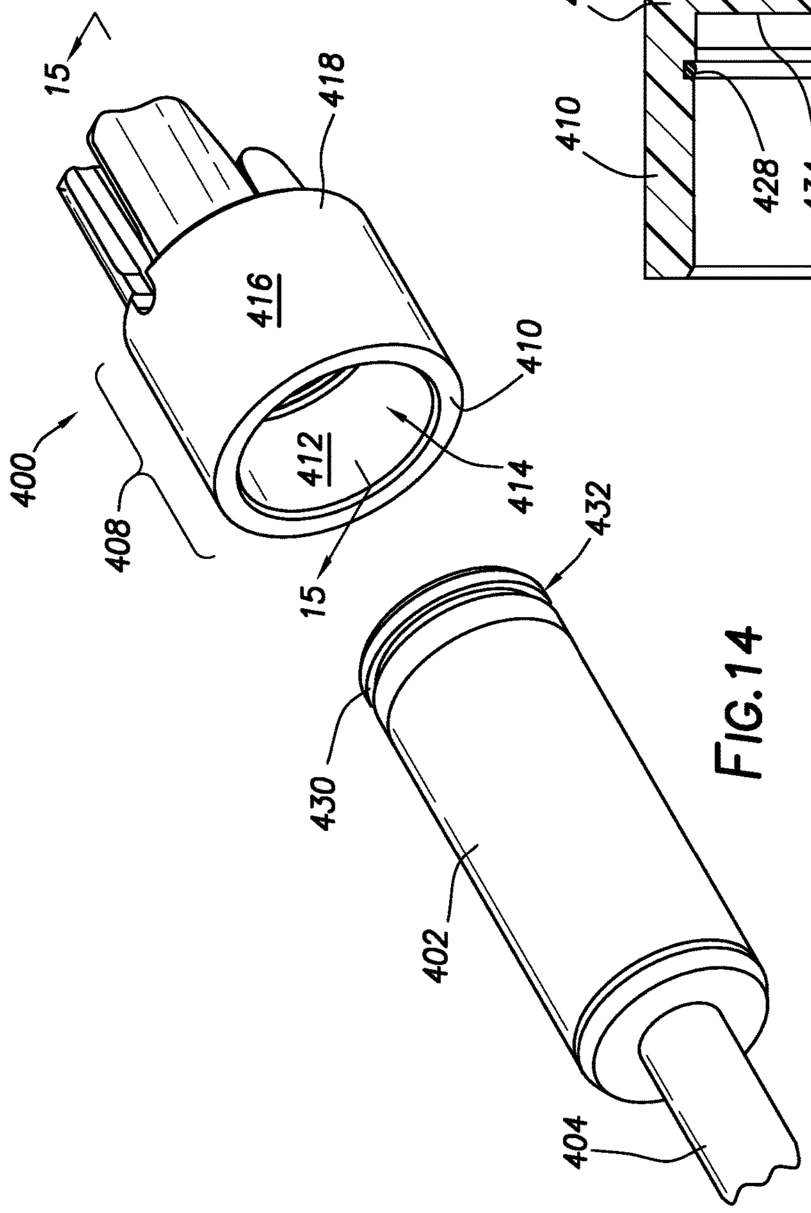
FIG. 14 is a perspective view showing a third embodiment of the present invention and a firearm barrel, from a proximal end of the embodiment.

FIG. 14 shows a third embodiment 400 of the device for use with a silencer 402 on a firearm barrel 404. The embodiment 400 has a barrel-receiving portion 408 with a wall 410 having a generally uniform interior surface 412 that forms a substantially cylindrical volume 414 and a generally uniform exterior surface 416. Concerning the latter, the exterior surface 416 has a cylindrical profile that does not vary due to features on the exterior. Rather, the exterior surface 416 is a single, continuous surface that extends from a cylindrical base member 418

Figure 15:
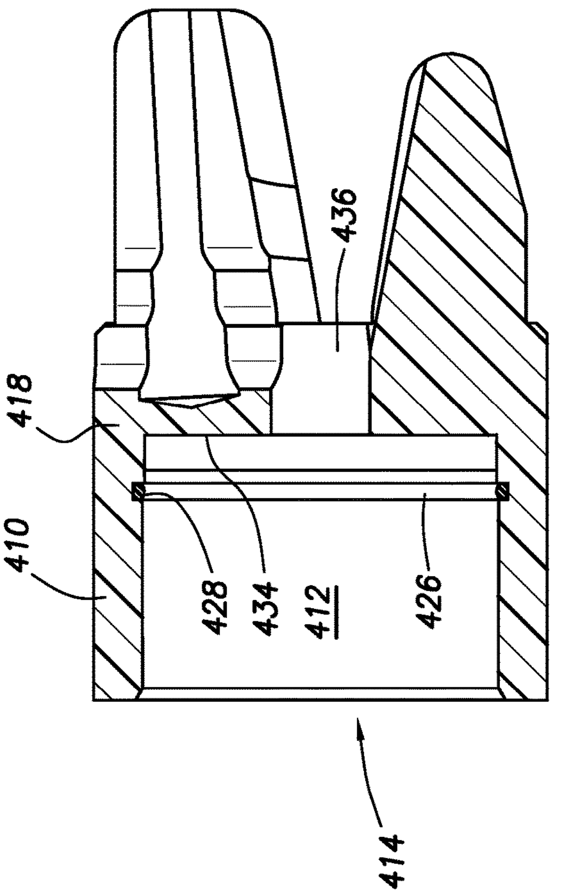
FIG. 15 is a side cross-sectional view of the embodiment shown in FIG. 14, taken along section line 15-15 in FIG. 14.

FIG. 15 illustrates the substantially cylindrical volume 414 formed by the interior surface 412 of the wall 410. The interior surface 412 has a groove 426 disposed therein that accepts an O-ring 428. The silencer 402 has a flange 430 and a groove 432 disposed around its circumference and, during insertion, the O-ring 428 flexes radially outward until the flange 430 is between the groove 426 and a proximal end 434 of the base member 418 with a projectile aperture 436. Then, once the flange 430 is positioned between the groove 426 and the proximal end 434, the O-ring 428 rests within the groove 426 on the interior surface 412 and the groove 432 on the silencer 402, thereby helping to hold the embodiment 400 in place on the silencer 402.

The present invention may be manufactured in a variety of ways. For example, the device may be made from a hard plastic or metal (e.g., aluminum) blank inserted into a computer numerical control (CNC) machine with the appropriate machine control instructions. Alternatively, the device may be made from injection-molded plastic or made from other manufacturing methods known in the art.

The present invention is described in terms of specifically described embodiments. Those skilled in the art will recognize that other embodiments of such device can be used in carrying out the present invention. Other aspects and advantages of the present invention may be obtained from a study of this disclosure and the drawings, along with the appended claims.

The invention claimed is:

1. A chain cutting apparatus that aligns a target link and an adjacent link of a multi-link chain for ballistic opening of the target link, comprising:

a base member having a proximal end, a distal end, and a projectile aperture extending between said proximal end and said distal end, said projectile aperture having a center axis;

at least one wall extending from the proximal end of the base member, said at least one wall having an interior surface at least partially defining a substantially cylindrical volume, said substantially cylindrical volume having a center axis coaxial with the center axis of the projectile aperture;

a first target link pin extending from the distal end, said first target link pin having a first pin adjacent link engagement region and a first pin target link alignment region, said first pin adjacent link engagement region having a curved surface;

a second target link pin extending from the distal end, said second target link pin having a second pin adjacent link engagement region and a second pin target link alignment region, said second pin adjacent link engagement region having a curved surface;

a slot between the first target link pin and the second target link pin, said slot having a first sidewall at least partially defined by the first pin target link alignment region and a second sidewall at least partially defined by the second pin target link alignment region, said sidewalls defining a width of said slot, said sidewalls having at least one pair of corresponding steps where said width increases, said at least one pair of corresponding steps being oriented substantially orthogonal to the center axis of the projectile aperture;

an adjacent link pin extending from the distal end, said adjacent link pin having a target link engagement surface; and wherein the curved surface of the first pin adjacent link engagement region and the curved surface of the second pin adjacent link engagement region are aligned to define a partial circumference of at least one circle having a center not coaxial with the center axis of the projectile aperture.

2. The chain cutting apparatus of claim 1 wherein the first pin target link alignment region has a planar surface and the second pin target link alignment region has a planar surface substantially parallel to said planar surface of the first pin target link alignment region.

3. The chain cutting apparatus of claim 2 wherein the distal end comprises a planar surface oriented substantially orthogonal to the planar surface of the first pin target link alignment region and the planar surface of the second pin target link alignment region.

4. The chain cutting apparatus of claim 3 wherein the planar surface of the distal end is oriented substantially orthogonal to the center axis of the projectile aperture.

5. The chain cutting apparatus of claim 3 wherein the sidewalls of the slot extend through the planar surface of the distal end and said slot has a bottom within the base member.

6. The chain cutting apparatus of claim 5 wherein the at least one pair of corresponding steps is a plurality of pairs of corresponding steps and the width of the slot increases at each pair of corresponding steps.

7. The chain cutting apparatus of claim 6 wherein one pair of the plurality of pairs of corresponding steps is adjacent the planar surface of the distal end.

8. A chain cutting apparatus that aligns a target link and an adjacent link of a multi-link chain for ballistic opening of the target link, comprising:

a base member having a proximal end, a distal end with a planar surface, and a projectile aperture extending between said proximal end and said distal end, said projectile aperture having a center axis;

at least one wall extending from the proximal end of the base member, said at least one wall having an interior surface at least partially defining a substantially cylindrical volume, said substantially cylindrical volume having a center axis coaxial with the center axis of the projectile aperture;

a first target link pin extending from the distal end, said first target link pin having a first pin adjacent link engagement region and a first pin target link alignment region, said first pin adjacent link engagement region having a curved surface;

a second target link pin extending from the distal end, said second target link pin having a second pin adjacent link engagement region and a second pin target link alignment region, said second pin adjacent link engagement region having a curved surface;

a slot between the first target link pin and the second target link pin, said slot having a first sidewall at least partially defined by the first pin target link alignment region and a second sidewall at least partially defined by the second pin target link alignment region, said sidewalls defining a width of said slot and extending through the planar surface of the distal end into the base member; and an adjacent link pin extending from the distal end, said adjacent link pin having a target link engagement surface; and wherein the curved surface of the first pin adjacent link engagement region and the curved surface of the second pin adjacent link engagement region are aligned to define a partial circumference of at least one circle having a center not coaxial with the center axis of the projectile aperture.

9. The chain cutting apparatus of claim 8 wherein the planar surface of the distal end is oriented substantially orthogonal to the center axis of the projectile aperture.

10. The chain cutting apparatus of claim 8 wherein the first pin target link alignment region has a planar surface and the second pin target link alignment region has a planar surface substantially parallel to said planar surface of the first pin target link alignment region.

11. The chain cutting apparatus of claim 10 wherein the planar surface of the distal end is oriented substantially orthogonal to the center axis of the projectile aperture.

12. The chain cutting apparatus of claim 11 wherein the planar surface of the distal end is oriented substantially orthogonal to the planar surface of the first pin target link alignment region and the planar surface of the second pin target link alignment region.

13. A chain cutting apparatus that aligns a pin target link and an adjacent link of a multi-link chain for ballistic opening of the target link, comprising:

a base member having a proximal end, a distal end, and a projectile aperture extending between said proximal end and said distal end, said projectile aperture having a center axis;

at least one wall extending from the proximal end of the base member, said at least one wall having an interior surface at least partially defining a substantially cylindrical volume, said substantially cylindrical volume having a center axis coaxial with the center axis of the projectile aperture;

a first target link pin extending from the distal end, said first target link pin having a first pin adjacent link engagement region and a first pin target link alignment region, said first pin adjacent link engagement region having a curved surface;

a second target link pin extending from the distal end, said second target link pin having a second pin adjacent link engagement region and a second pin target link alignment region, said second pin adjacent link engagement region having a curved surface;

a slot between the first target link pin and the second target link pin, said slot being at least partially defined by the first pin target link alignment region and the second pin target link alignment region;

an adjacent link pin extending from the distal end, said adjacent link pin having a target link engagement surface; and wherein the curved surface of the first pin adjacent link engagement region and the curved surface of the second pin adjacent link engagement region are aligned to define a partial circumference of at least one circle having a center not coaxial with the center axis of the projectile aperture.

14. The chain cutting apparatus of claim 13 wherein the curved surface of the first pin adjacent link engagement region and the curved surface of the second pin adjacent link engagement region are aligned to define a partial circumference of a plurality of circles, each circle in said plurality of circles having a center not coaxial with the center axis of the projectile aperture.

15. The chain cutting apparatus of claim 14 wherein the curved surface of the first pin adjacent link engagement region and the curved surface of the second pin adjacent link engagement region have at least one pair of corresponding steps.

16. The chain cutting apparatus of claim 15 wherein the curved surface of the first pin adjacent link engagement region and the curved surface of the second pin adjacent link engagement region have a plurality of pairs of corresponding steps.

17. The chain cutting apparatus of claim 13 wherein the distal end of the base member further comprises a planar surface intersecting the curved surface of the first pin adjacent link engagement region and the curved surface of the second pin adjacent link engagement region.

18. The chain cutting apparatus of claim 17 wherein the curved surface of the first pin adjacent link engagement region and the curved surface of the second pin adjacent link engagement region each extend from their intersection with the planar surface at an obtuse angle.

19. The chain cutting apparatus of claim 17 wherein the planar surface is oriented substantially orthogonal to the center axis of the projectile aperture.

20. A chain cutting apparatus that aligns a target link and an adjacent link of a multi-link chain for ballistic opening of the target link, comprising:

a base member having a proximal end, a distal end, and a projectile aperture extending between said proximal end and said distal end, said projectile aperture having a center axis;

at least one wall extending from the proximal end of the base member, said at least one wall having an interior surface at least partially defining a substantially cylindrical volume, said substantially cylindrical volume having a center axis coaxial with the center axis of the projectile aperture;

a first target link pin extending from the distal end, said first target link pin having a first pin adjacent link engagement region and a first pin target link alignment region, said first pin target link alignment region having a planar surface, said first pin adjacent link engagement region having a curved surface;

a second target link pin extending from the distal end, said second target link pin having a second pin adjacent link engagement region and a second pin target link alignment region, said second pin target link alignment region having a planar surface parallel to the planar surface of the first pin target link alignment region, said second pin adjacent link engagement region having a curved surface;

a slot between the first target link pin and the second target link pin, said slot being at least partially defined by the first pin target link alignment region and the second pin target link alignment region;

an adjacent link pin extending from the distal end, said adjacent link pin having a curved target link engagement surface; and wherein the curved surface of the first pin adjacent link engagement region and the curved surface of the second pin adjacent link engagement region are aligned to define a partial circumference of at least one circle having a center not coaxial with the center axis of the projectile aperture.

21. The chain cutting apparatus of claim 20 wherein the curved target link engagement surface widens as the adjacent link pin extends away from the distal end.

22. The chain cutting apparatus of claim 20 wherein the adjacent link pin further comprises an angled back surface opposite the curved target link engagement surface.

23. The chain cutting apparatus of claim 22 wherein the back surface is oriented at an acute angle with respect to the center axis of the projectile aperture.

* * * * *